US012565216B2

(12) United States Patent
Shufro

(10) Patent No.: US 12,565,216 B2
(45) Date of Patent: *Mar. 3, 2026

(54) AUTHENTICATED TRAFFIC SIGNS

(71) Applicant: Panasonic Automotive Systems America, LLC., Peachtree City, GA (US)

(72) Inventor: Eric Shufro, Peachtree City, GA (US)

(73) Assignee: Panasonic Automotive Systems America, LLC., Peachtree City, GA (US)

( * ) Notice: Subject to any disclaimer, the term of this patent is extended or adjusted under 35 U.S.C. 154(b) by 675 days.

This patent is subject to a terminal disclaimer.

(21) Appl. No.: 17/476,086

(22) Filed: Sep. 15, 2021

(65) Prior Publication Data

US 2022/0001869 A1     Jan. 6, 2022

Related U.S. Application Data

(63) Continuation of application No. 16/142,012, filed on Sep. 26, 2018, now Pat. No. 11,150,667.

(Continued)

(51) Int. Cl.
H04W 64/00          (2009.01)
B60W 40/02          (2006.01)
(Continued)

(52) U.S. Cl.
CPC .......... B60W 40/02 (2013.01); B60W 60/001 (2020.02); G01S 19/42 (2013.01);
(Continued)

(58) Field of Classification Search
CPC ....... H04W 4/025; H04W 64/00; H04W 4/80; H04W 12/033; H04W 12/08;
(Continued)

(56) References Cited

U.S. PATENT DOCUMENTS 6,091,956 A * 7/2000 Hollenberg ............ G06Q 30/02
                                                    455/566
8,180,280 B2 * 5/2012 George ................... H04W 4/40
                                                    455/11.1

(Continued)

FOREIGN PATENT DOCUMENTS

AU        2014218381 A1 * 4/2015 ............... G06K 9/78
AU        2014239914 A1 * 10/2015 ............. G01S 13/04

(Continued)

OTHER PUBLICATIONS

F. Qiao, J. Wang, X. Wang, J. Jia and L. Yu, "A RFID based e-STOP sign and its impacts to vehicle emissions," 2012 15th International IEEE Conference on Intelligent Transportation Systems, Anchorage, AK, USA, 2012, pp. 206-211, doi: 10.1109/ITSC.2012. 6338899 (Year: 2012).*

(Continued)

*Primary Examiner* — Cuong H Nguyen
(74) *Attorney, Agent, or Firm* — Laurence S. Roach, Esq.

(57)          ABSTRACT

A street sign authentication arrangement for a motor vehicle includes an RFID tag reader for reading information encrypted on a street sign encountered by the motor vehicle. An electronic processor is communicatively coupled to the RFID tag reader, and verifies, based on the information read from the street sign, that the information was encrypted by an authorized entity. The processor controls movement of the motor vehicle based on the information read from the street sign if the processor is able to verify that the information was encrypted by the authorized entity. The processor refrains from controlling movement of the motor vehicle based on the information read from the street sign if the processor is not able to verify that the information was encrypted by the authorized entity.

18 Claims, 2 Drawing Sheets read information encrypted on a street sign encountered by a motor vehicle  — 202 determine, based on the information read from the street sign, whether the information was encrypted by an authorized entity  — 204 control movement of the motor vehicle based on the information read from the street sign if it was determined that the information was encrypted by the authorized entity  — 206 refrain from controlling movement of the motor vehicle based on the information read from the street sign if it was determined that the information was not encrypted by the authorized entity  — 208

200

Related U.S. Application Data

(60) Provisional application No. 62/563,763, filed on Sep. 27, 2017.

(51) Int. Cl.
| | |
|---|---|
| *B60W 60/00* | (2020.01) |
| *G01S 19/42* | (2010.01) |
| *G06K 7/10* | (2006.01) |
| *G09F 7/00* | (2006.01) |

(52) U.S. Cl.
CPC .......... *G06K 7/10366* (2013.01); *G09F 7/00* (2013.01); *B60W 2420/403* (2013.01); *B60W 2552/00* (2020.02); *B60W 2555/60* (2020.02); *B60W 2556/45* (2020.02); *G09F 2007/005* (2013.01)

(58) Field of Classification Search
CPC ....... H04W 4/027; H04W 4/40; H04W 12/06; H04W 12/065; H04W 4/38; B60W 40/02; G01S 19/425; H04L 67/12; H04L 63/0428; H04L 63/08; G06V 20/582; G05D 1/0246
USPC ........... 701/23; 715/716; 340/539.13, 686.1; 455/456.6
See application file for complete search history.

(56) References Cited

U.S. PATENT DOCUMENTS

| | | | | |
|---|---|---|---|---|
| 8,849,493 | B2 * | 9/2014 | Prada Gomez .... | B62D 15/0285 701/2 |
| 9,024,754 | B2 * | 5/2015 | Dalley, Jr. .......... | G06K 7/10366 340/539.13 |
| 9,224,293 | B2 * | 12/2015 | Taylor .................. | G08G 1/0116 |
| 9,833,097 | B2 * | 12/2017 | Byers ..................... | A47G 29/14 |
| 9,836,740 | B1 * | 12/2017 | Geist .................. | G06Q 20/3821 |
| 10,037,689 | B2 * | 7/2018 | Taylor .................. | G05D 1/0285 |
| 10,991,242 | B2 * | 4/2021 | Taylor ...................... | H04Q 9/00 |
| 11,150,667 | B2 * | 10/2021 | Shufro .................. | H04W 12/03 |
| 11,520,354 | B1 * | 12/2022 | Harris ....................... | G08G 1/22 |
| 2006/0026017 | A1 * | 2/2006 | Walker .................. | H04L 63/302 701/31.4 |
| 2007/0271596 | A1 * | 11/2007 | Boubion ................. | G06F 21/77 726/3 |
| 2012/0274775 | A1 * | 11/2012 | Reiffel ................... | G06Q 30/08 348/158 |
| 2015/0213701 | A1 * | 7/2015 | Dalley, Jr. .......... | G08B 21/0275 340/539.13 |
| 2016/0344745 | A1 * | 11/2016 | Johnson .............. | H04L 41/0803 |
| 2017/0337813 | A1 * | 11/2017 | Taylor .................. | G05D 1/0285 |
| 2020/0207358 | A1 * | 7/2020 | Katz .................. | G01C 21/3697 |

FOREIGN PATENT DOCUMENTS

| | | | | |
|---|---|---|---|---|
| CN | 201765698 U | * | 3/2011 | |
| CN | 103765828 A | * | 4/2014 | ........ B60W 50/0098 |
| CN | 102201164 B | * | 9/2015 | |
| CN | 105637916 A | * | 6/2016 | .......... G06Q 50/265 |
| CN | 205788299 U | * | 12/2016 | |
| CN | 106355127 A | * | 1/2017 | ........ G06K 7/10316 |
| CN | 103765828 B | * | 2/2017 | ........ B60W 50/0098 |
| CN | 106815613 A | * | 6/2017 | |
| CN | 107155407 A | * | 9/2017 | ............. G01C 21/34 |
| CN | 105637916 B | * | 11/2019 | .......... G06Q 50/265 |
| DE | 102005045947 A1 | * | 6/2007 | ....... H04L 29/12103 |
| DE | 102013225106 A1 | * | 6/2015 | ............. G06F 21/33 |
| EP | 3078218 B1 | * | 7/2020 | ............. G06F 21/33 |
| GB | 2419110 A | * | 4/2006 | .......... B41M 3/003 |

OTHER PUBLICATIONS

An_RFID_Based_Intelligent_Vehicle_Speed_Controller by Joshue Perez et al in Sensors 2010, 10, 5872-5887 (Year: 2010).*

Li, Qing, et al. "Drivers' smart advisory system improves driving performance at STOP sign intersections." Journal of traffic and transportation engineering (English edition) 4.3 (2017): 262-271. (Year: 2017).*

Li, Qing, et al. Developing a short range vehicle to infrastructure communication system to enhance the safety at STOP sign intersections. No. TranLIVE/TSU/16/03. TranLIVE. University of Idaho, 2016. (Year: 2016).*

Jang, Jeong Ah, Hyun Suk Kim, and Han Byeog Cho. "Smart roadside system for driver assistance and safety warnings: Framework and applications." Sensors 11.8 7420-7436 (Year: 2011).*

Li, Qing, et al. "Driving performance test of stop signs with drivers smart advisory system." The 28th Annual Conference of the International Chinese Transportation Professionals Association (ICTPA), Los Angeles. 2015. (Year: 2015).*

Alharbi, Fares, et al. "Intelligent transportation using wireless sensor networks blockchain and license plate recognition." Sensors 23.5 (2023): 2670.*

Jang, Jeong Ah, Hyun Suk Kim, and Han Byeog Cho. "Smart roadside system for driver assistance and safety warnings: Framework and applications." Sensors 11.8 (2011): 7420-7436.*

Li, Qing, et al. Developing a short range vehicle to infrastructure communication system to enhance the safety at STOP sign intersections. No. TranLIVE/TSU/16/03. TranLIVE. University of Idaho, 2016.*

* cited by examiner

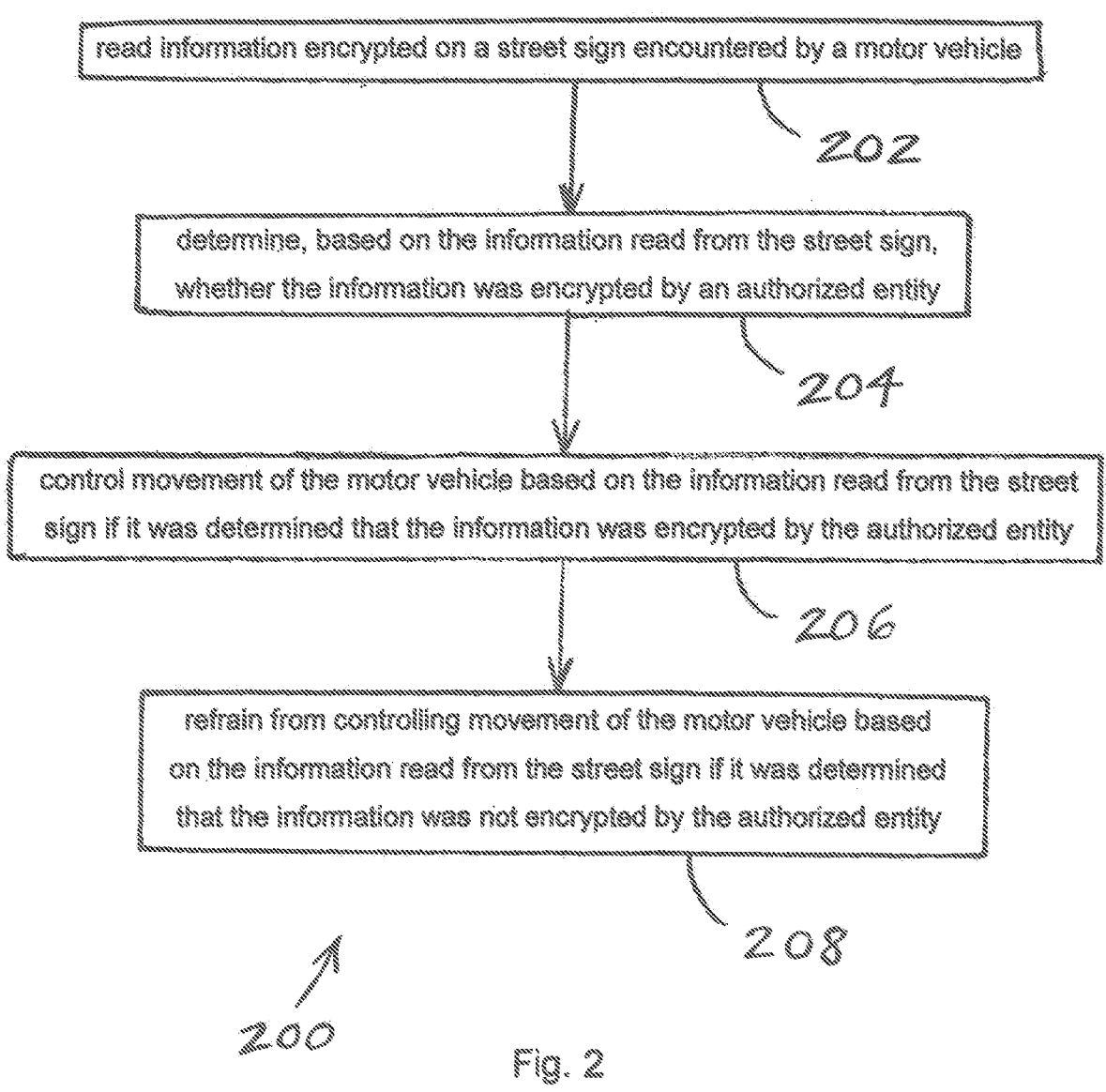

read information encrypted on a street sign encountered by a motor vehicle

202 determine, based on the information read from the street sign, whether the information was encrypted by an authorized entity

204 control movement of the motor vehicle based on the information read from the street sign if it was determined that the information was encrypted by the authorized entity

206 refrain from controlling movement of the motor vehicle based on the information read from the street sign if it was determined that the information was not encrypted by the authorized entity

AUTHENTICATED TRAFFIC SIGNS

CROSS-REFERENCE TO RELATED APPLICATION

This application is a continuation of U.S. patent application Ser. No. 16/142,012, filed on Sep. 26, 2018, which is currently under allowance, which claims benefit of U.S. Provisional Application No. 62/563,763 filed on Sep. 27, 2017, which the disclosure of which are hereby incorporated by reference in their entirety for all purposes.

FIELD OF THE INVENTION

The disclosure relates to an electronic street sign reading system in a motor vehicle.

BACKGROUND OF THE INVENTION

The ability of software to detect and read street signs is not new. Police have automated license plate readers. Moreover, today's autonomous vehicles can stop when encountering a stop sign.

If existing infrastructure is not modified for the autonomous vehicles of the future, it will be possible for attackers to influence the behavior of an autonomous vehicle by creating and displaying incorrect signage. This attack method may be used to ambush a vehicle and its occupants.

SUMMARY

The present invention may apply existing encryption and tagging techniques to new or existing traffic signs via printable stick-on media. The stick-on media may contain a passive radio frequency identification (RFID) tag which may be energized on demand by one or more nearby vehicles containing the necessary RFID reading hardware. The passive RFID tags and readers may be similar to those used by existing highway toll systems.

The tags may be designed in such a way that they are not removable from the signs without destroying the tag. Such tearable tag technology exists today.

The invention may provide an authenticated traffic control device which cannot be spoofed by non-authorized agents. In the immediate future, the need for autonomous vehicles to interact with non-autonomous cars and traffic control devices (infrastructure) will be crucial for successful and safe deployment of autonomous vehicle technology.

The present invention may include applying the above-described technology to every piece of critical traffic control infrastructure. The applied tag may contain information which not only identifies the infrastructure type and content, but also proves the authenticity and assigned location of the infrastructure.

The tag data may be cryptographically signed via a public key certificate issued by the controlling authority/municipality. The tag may also include a complete certificate chain for additional levels of trust. For example, a sign placed in Peachtree City, Georgia would not only be signed by the Peachtree City authority, but the certificate chain would include the signature of the state of Georgia or possibly the United States Department of Transportation. The number of certificates in the chain may depend on the amount of trust necessary to achieve reasonable levels of confidence that the infrastructure is authentic. The number of certificates in the chain may also be dictated by future local, state or federal laws put in place to regulate this technology.

New infrastructure certificates may be issued as the boundaries of the authorities evolve. Existing tags may retain validity for an arbitrary length of time determined by the earliest certificate expiration date within the chain of certificates. Upon expiration, the issuing authority may need to apply new tags to existing infrastructure.

To supplement the above-described technology, future Vehicle to Infrastructure V2X technology is expected to crowd source data from individual vehicles regarding the placement and location of signage. This supplementary technology may be used in conjunction with the information disclosed above to create a database of known signs. A sign which has been inadvertently removed, or disabled may still be known to connected vehicles. When the vehicle approaches the location of the sign, regardless of the sign's presence, the correct action may still be taken if the controlling authority has not removed the sign from the database. Connected vehicles may also electronically contact a certificate revocation list (CRL) to determine whether a sign's certificate has been revoked. Crowd source information may also be used to notify authorities that a sign tag has expired.

Future network connected tags could be developed which would be capable of changing their content in real-time. This feature might be used to change the meaning of a sign or to signify a state change of a traffic light or other device that is capable of conveying multiple messages. For example, parking infrastructure tags could relay "no parking" during certain hours and "parking allowed" during other hours.

In one embodiment, the invention comprises a street sign authentication arrangement for a motor vehicle, including an RFID tag reader for reading information encrypted on a street sign encountered by the motor vehicle. An electronic processor is communicatively coupled to the RFID tag reader, and verifies, based on the information read from the street sign, that the information was encrypted by an authorized entity. The processor controls movement of the motor vehicle based on the information read from the street sign if the processor is able to verify that the information was encrypted by the authorized entity. The processor refrains from controlling movement of the motor vehicle based on the information read from the street sign if the processor is not able to verify that the information was encrypted by the authorized entity.

In another embodiment, the invention comprises a street sign authentication method for a motor vehicle, including reading information encrypted on a street sign encountered by the motor vehicle. It is determined, based on the information read from the street sign, whether the information was encrypted by an authorized entity. Movement of the motor vehicle is controlled based on the information read from the street sign if it was determined that the information was encrypted by the authorized entity. However, movement of the motor vehicle is not controlled based on the information read from the street sign if it was determined that the information was not encrypted by the authorized entity.

In yet another embodiment, the invention comprises a motor vehicle including an image-capturing device capturing an image of a street sign encountered by the motor vehicle. An electronic processor is communicatively coupled to the image-capturing device and to an electronic tag reader. The electronic processor causes the electronic tag reader to read information encrypted on a tag on the street sign in response to the image-capturing device capturing the image of the street sign. The electronic processor determines, based on the information read from the street sign, whether the information was encrypted by an authorized entity. The electronic processor controls movement of the motor vehicle based on the information read from the street sign if it is determined that the information was encrypted by the authorized entity. The electronic processor refrains from controlling movement of the motor vehicle based on the information read from the street sign if it is determined that the information was not encrypted by the authorized entity.

An advantage of the invention is that it may prevent spoofing of traffic control signs which may cause autonomous vehicles to stop or react in deleterious ways on a given route.

BRIEF DESCRIPTION OF THE DRAWINGS

A better understanding of the present invention will be had upon reference to the following description in conjunction with the accompanying drawings.

FIG. 2 is a flow chart of one embodiment of a street sign authentication method of the present invention for a motor vehicle.

DETAILED DESCRIPTION OF THE PREFERRED EMBODIMENTS

Figure 1:
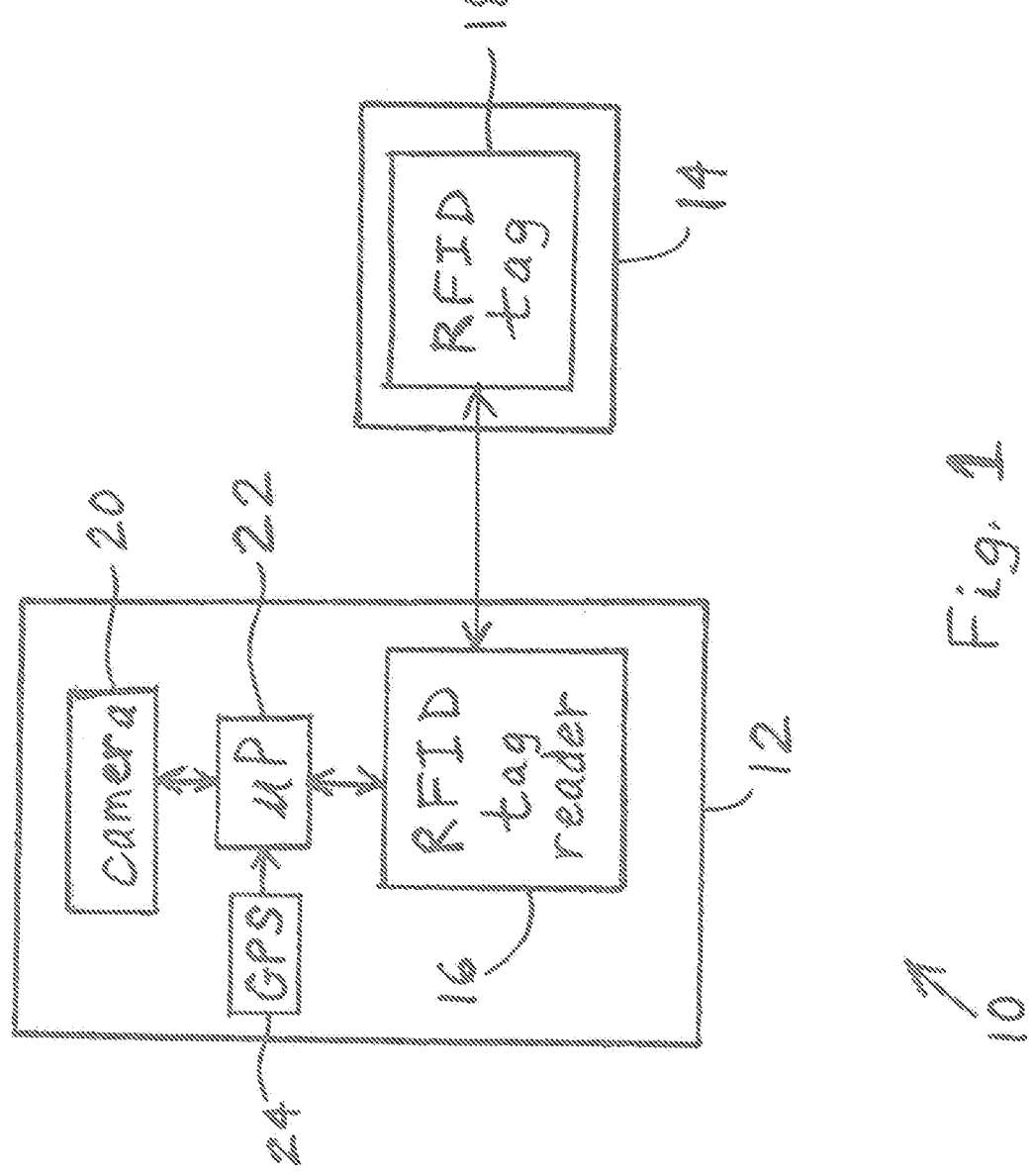
FIG. 1 is a block diagram of one example embodiment of a street sign authentication arrangement of the present invention for a motor vehicle.

FIG. 1 illustrates one example embodiment of a street sign authentication arrangement 10 of the present invention. Arrangement 10 includes a motor vehicle 12 and a traffic sign 14. Vehicle 12 includes an RFID tag reader 16 that reads an RFID tag 18 on traffic sign 14. RFID tag reader 16 may include a transceiver and a decoder, as is conventionally known. RFID tag reader 16 may read and authenticate a certificate on RFID tag 18 as well as the message on sign 14, such as "STOP", for example. RFID tag reader 16 may use a public key to decrypt what is read from tag 18 and thereby verify that the message on tag 18 is being provided by a proper authority, such the municipality in which sign 14 is disposed.

Vehicle 12 may also include a camera 20 and an electronic processor 22 which may be in bi-directional communication with each of camera 20 and reader 16. During use, processor 22 may determine when camera 20 captures an image of a street sign, such as sign 14. In response to this determination, processor 22 may cause reader 16 to read tag 18. If reader 16 finds that tag 18 is providing a proper certificate, as can only be provided by the legitimate municipality or other authority, then processor 22 may heed the message on sign 14 and cause vehicle 12 to operate accordingly (e.g., to come to a stop in response to a "STOP" sign). However, if reader 16 finds that tag 18 is not providing a proper certificate, then processor 22 may ignore the message on sign 14 and possibly wirelessly report the uncertified sign 14 to proper authorities (e.g., police) via the Internet for investigation and possible removal of sign 14.

Vehicle 12 may also include a global positioning system (GPS) module 24 for verifying that the location of sign 14 matches the location encoded on tag 18. If the locations do not match, then processor 22 may ignore the message on sign 14 and possibly wirelessly report sign 14 to proper authorities via the Internet for investigation, relocation, and/or removal of sign 14. Processor 22 may determine the exact GPS location of sign 14 based on the GPS location of vehicle 12, as provided by GPS 24, and based on the image of sign 14 captured by camera 20.

The invention has been described as using RFID technology. However, other technology such as QR codes may also be used within the scope of the invention.

FIG. 2 illustrates one embodiment of a street sign authentication method 200 of the present invention for a motor vehicle. In a first step 202, reading information is encrypted on a street sign encountered by the motor vehicle. For example, an RFID tag 18 may be provided on traffic sign 14. There may be a certificate on RFID tag 18 including encrypted reading information.

Next, in step 204, it is determined, based on the information read from the street sign, whether the information was encrypted by an authorized entity. For example, RFID tag reader 16 may read and authenticate a certificate on RFID tag 18. RFID tag reader 16 may use a public key to decrypt what is read from tag 18 and thereby verify that the message on tag 18 is being provided by a proper authority, such the municipality in which sign 14 is disposed.

In a next step 206, movement of the motor vehicle is controlled based on the information read from the street sign if it was determined that the information was encrypted by the authorized entity. For example, RFID tag reader 16 may read a message that is encrypted on tag 18 as well as printed on sign 14 without encryption, such as "STOP". If reader 16 finds that tag 18 is providing a proper certificate, as can only be provided by the legitimate municipality or other authority, then processor 22 may heed the message on sign 14 and cause vehicle 12 to operate accordingly (e.g., to come to a stop in response to the "STOP" sign).

In a final step 208, controlling movement of the motor vehicle based on the information read from the street sign is refrained from if it was determined that the information was not encrypted by the authorized entity. For example, if reader 16 finds that tag 18 is not providing a proper certificate, then processor 22 may ignore the message on sign 14.

The foregoing description may refer to "motor vehicle", "automobile", "automotive", or similar expressions. It is to be understood that these terms are not intended to limit the invention to any particular type of transportation vehicle. Rather, the invention may be applied to any type of transportation vehicle whether traveling by air, water, or ground, such as airplanes, boats, etc.

The foregoing detailed description is given primarily for clearness of understanding and no unnecessary limitations are to be understood therefrom for modifications can be made by those skilled in the art upon reading this disclosure and may be made without departing from the spirit of the invention.

What is claimed is:

1. A street sign authentication arrangement for a motor vehicle, the arrangement comprising:
    an image-capturing device configured to capture an image of a street sign encountered by the motor vehicle;
    an RFID tag reader configured to read information encrypted on the street sign; and
    an electronic processor communicatively coupled to the RFID tag reader and to the image-capturing device, the electronic processor being configured to:
        recognize the street sign in the captured image;
        cause the RFID tag reader to read the information encrypted on the street sign in response to recognizing the street sign in the captured image; and
        control movement of the motor vehicle based on the information read from the street sign.

2. The arrangement of claim 1 wherein the processor is configured to:

verify that the information was encrypted by an authorized entity;

control movement of the motor vehicle based on the information read from the street sign only if the processor is able to verify that the information was encrypted by the authorized entity; and refrain from controlling movement of the motor vehicle based on the information read from the street sign if the processor is not able to verify that the information was encrypted by the authorized entity.

3. The arrangement of claim 2 wherein the processor is configured to wirelessly inform an authority about the sign in response to the processor not being able to verify that the information was encrypted by the authorized entity.

4. The arrangement of claim 2 wherein the electronic processor is configured to brake the motor vehicle to a stop based on the information read from the street sign if the processor is able to verify that the information was encrypted by the authorized entity.

5. A motor vehicle, comprising:

an image-capturing device configured to capture an image of a street sign encountered by the motor vehicle;

an electronic tag reader; and an electronic processor communicatively coupled to the image-capturing device and the electronic tag reader, the electronic processor being configured to:

cause the electronic tag reader to read information encrypted on a tag on the street sign in response to the image-capturing device capturing the image of the street sign; and control movement of the motor vehicle based on the information read from the street sign.

6. The arrangement of claim 1 further comprising a GPS module communicatively coupled to the electronic processor and configured to determine a location of the motor vehicle, the electronic processor being configured to determine a location of the sign based upon the location of the motor vehicle and the image of the street sign.

7. The arrangement of claim 6 wherein the electronic processor is configured to:

control movement of the motor vehicle based on the information read from the street sign if the location of the sign as determined by the processor matches location information in the information read from the street sign; and refrain from controlling movement of the motor vehicle based on the information read from the street sign if the location of the sign as determined by the processor does not match the location information in the information read from the street sign.

8. A street sign authentication method for a motor vehicle, the method comprising the computer-implemented steps of:

capturing an image of a street sign encountered by the motor vehicle;

recognizing the street sign in the captured image;

reading information encrypted on the street sign, wherein the information encrypted on the street sign is read in response to the recognizing of the street sign in the captured image; and automatically controlling movement of the motor vehicle based on the information read from the street sign.

9. The method of claim 8 further comprising the computer-implemented steps of:

determining whether the information was encrypted by an authorized entity, wherein the movement of the motor vehicle is controlled based on the information read from the street sign if it was determined that the information was encrypted by the authorized entity; and refraining from controlling movement of the motor vehicle based on the information read from the street sign if it was determined that the information was not encrypted by the authorized entity.

10. The method of claim 9 further comprising automatically wirelessly informing an authority about the sign in response to a determination that the information was not encrypted by the authorized entity.

11. The method of claim 9 further comprising automatically braking the motor vehicle to a stop based on the information read from the street sign if it was determined that the information was encrypted by the authorized entity.

12. The motor vehicle of claim 5 wherein the processor is configured to:

determine whether the information was encrypted by an authorized entity;

control movement of the motor vehicle based on the information read from the street sign if it is determined that the information was encrypted by the authorized entity; and refrain from controlling movement of the motor vehicle based on the information read from the street sign if it is determined that the information was not encrypted by the authorized entity.

13. The method of claim 8 further comprising the computer-implemented steps of:

using a GPS module to determine a location of the motor vehicle; and determining a location of the sign based upon the location of the motor vehicle and the image of the street sign.

14. The method of claim 13 wherein the movement of the motor vehicle is controlled based on the information read from the street sign if the determined location of the sign matches location information in the information read from the street sign, and wherein movement of the motor vehicle is not controlled based on the information read from the street sign if the location of the sign as determined by the processor does not match the location information in the information read from the street sign.

15. The motor vehicle of claim 12 wherein the electronic processor is configured to:

recognize the street sign in the captured image; and cause the electronic tag reader to read the information encrypted on the street sign in response to the recognizing of the street sign in the captured image.

16. The motor vehicle of claim 12 further comprising a GPS module communicatively coupled to the electronic processor and configured to determine a location of the motor vehicle, the electronic processor being configured to:

determine a location of the sign based upon the location of the motor vehicle and the image of the street sign;

control direction of travel and/or speed of travel of the motor vehicle based on the information read from the street sign if the location of the sign as determined by the processor matches location information in the information read from the street sign; and refrain from controlling direction of travel and/or speed of travel of the motor vehicle based on the information read from the street sign if the location of the sign as determined by the processor does not match the location information in the information read from the street sign.

17. The motor vehicle of claim 12 wherein the processor is configured to wirelessly inform an authority about the sign in response to the processor determining that the information was not encrypted by the authorized entity.

18. The motor vehicle of claim 12 wherein the electronic processor is configured to brake the motor vehicle to a stop based on the information read from the street sign only if the processor determines that the information was encrypted by the authorized entity.

\* \* \* \* \*